March 24, 1936. E. V. CROWELL Re. 19,897

METHOD OF CEMENTING WELLS

Original Filed March 1, 1927

INVENTOR.
Ernest V. Crowell,

BY R. W. Smith

ATTORNEY.

Reissued Mar. 24, 1936

Re. 19,897

UNITED STATES PATENT OFFICE 19,897

METHOD OF CEMENTING WELLS

Erd V. Crowell, Los Angeles, Calif.

Original application March 1, 1927, Serial No. 171,851. Divided and application January 10, 1929, Serial No. 331,411. Patent No. 1,828,100, dated October 20, 1931. This application for reissue December 24, 1932, Serial No. 648,819

2 Claims. (Cl. 166—21)

This invention is a method of cementing wells, the present application being a division of Patent Number 1,828,098, granted to me October 20, 1931, application for which as Serial Number 171,851, filed March 1, 1927, was co-pending at the time of the original on which application for this reissue is based.

It is an important object of the present invention to permit the carrying on of drilling operations or the circulation of a washing medium through the bore of a string of casing in a well and thence upwardly in the surrounding well bore, and of then forcing a cementing mixture downwardly through the bore of the casing to any predetermined level and thence outwardly through the casing to fill the surrounding bore. In practice, it has been found advantageous to have the full bore, or substantially the full bore, of a string of casing available when carrying on drilling operations or washing down the string of casing, and it is also desirable when circulating a washing medium preparatory to a cementing operation to utilize the bore of the casing, which should not be substantially impeded or restricted, and then to supply the cementing mixture through the unobstructed bore of the casing, or, at least, through a bore of the casing not restricted or obstructed to such an extent as to seriously impede or prevent the operation referred to, and to then discharge said cementing mixture at any predetemined level.

It is therefore a particular object of the present invention to provide for the flow of a circulating medium downwardly through the well casing and thence upwardly in the surrounding well bore, preferably by discharging the washing medium outwardly through the casing at the predetermined level at which the cementing mixture is adapted for subsequent discharge, but such discharge of circulating medium may be through the bottom of the casing, when said casing is not resting on a formation seat and when there is no other obstruction to securing circulation though the bottom of the casing, and it may be through peripheral ports in the casing when bottom circulation is impeded or prevented in any way or when the casing is resting on the formation seat, the present method being adaptable to all conditions which may be met in the cementing operation.

A plug, which is lowered in the casing accompanying or following the washing medium, may then be anchored immediately below peripheral ports, which are provided in the casing at any predetermined level, so that a subsequently introduced cementing mixture flows downwardly through the bore of the casing to the anchored plug; but is then prevented from flowing downwardly through the casing below the plug and is consequently discharged through the peripheral ports into the surrounding well bore.

It is a further object of the invention to force a traveling plug downwardly through the substantially unobstructed bore of the well casing in back of the quantity of cement which is to be discharged into the surrounding well bore, so as to force the cement through the peripheral ports of the well casing, and to then arrest the traveling plug by seating it on the anchored plug, so that its upper portion is above the peripheral ports in the casing, and thus indicate that all of the cement has been forced through the peripheral ports into the surrounding bore and to also permit the closure of the peripheral ports against back flow of the cement into the bore of the casing.

The invention will be readily understood from the following description of the accompanying drawing, in which.

Figure 1:
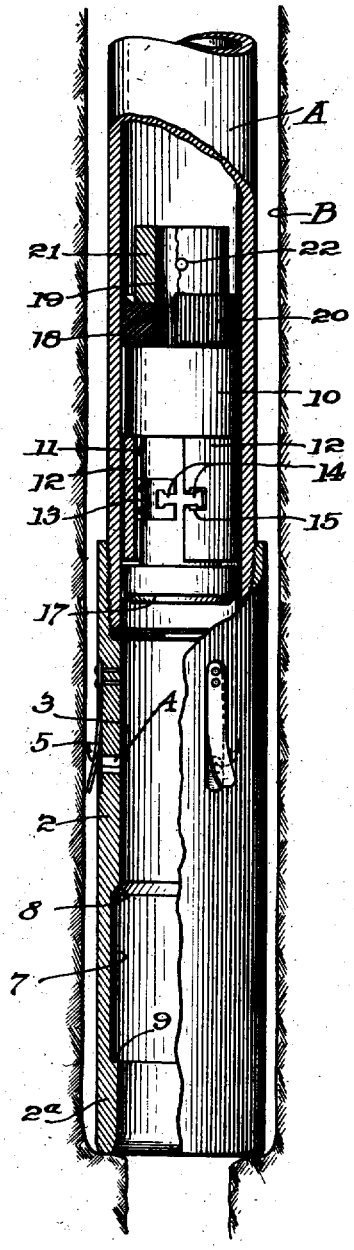
Fig. 1 is a vertical section through a well bore showing a string of casing, partly in axial section, and adapted for circulation of a washing medium prior to the cementing operation.

The method forming the subject-matter of this invention may be employed in connection with a usual string of well casing A which is adapted for reception in a well bore B, and at any predetermined level at which it is desired to discharge a cementing mixture a fixed section 2 of the string of casing, which has a substantially unobstructed bore 3 forming a continuation of the uniform bore of the string, is provided with peripheral ports 4. The ports 4 may be normally closed by spring pressed valves 5, but these valves are adapted to open responsive to pressure in the casing so as to permit discharge of material into the surrounding well bore.

Below the ports 4 of the bore of the ported section of the casing preferably has an increased diameter forming an elongated annular recess 7 terminating in upper and lower shoulders 8 and 9 formed by continuations of the uniform bore of the string of casing; and the lower shoulder 9 forms a seat for a plug 10 adapted for expansion into recess 7, while the upper shoulder 8 is preferably inclined to permit ready expansion of the plug when it is lowered through the bore of the casing to the level of the recess.

In order to provide anchoring means for plug 10 in recess 7, the plug is shown as provided with an intermediate reduced diameter 11 adapted to receive arcuate locking slips 12 which are adapted to contract wholly within the outer periphery of the plug. Bias springs 13 fixed to the plug in back of the slips engage the latter so as to tend to expand the same beyond the periphery of the plug, and expansion of the slips is preferably guided and limited by abutments 14 on the plug engaging in notches 15 in the slips. As the plug is lowered through casing A, the uniform bore of the latter contracts the slips to permit free passage of the plug, and when the plug is opposite recess 7, the annular enlargement formed thereby permits springs 13 to expand the slips so that they rest on the shoulder 9 and thereby anchor the plug.

Packing is preferably mounted on the plug to insure a tight shutting off of the casing when the plug is anchored in recess 7, the parts being so arranged that when the plug is anchored its packing closes the bore of the casing just below ports 4. As a consequence, a cementing mixture introduced into the well casing above the anchored plug is prevented from flowing down the casing past the plug and thereby forces valves 5 open for discharge of the cement through the ports 4 into the surrounding well bore.

A predetermined supply of the cementing mixture is preferably thus discharged through ports 4, the quantity of cement being measured by a traveling plug 16 lowered in the well casing in back of the cementing mixture. The traveling plug slides freely in the uniform bore of the casing and is preferably provided with packing to prevent leakage of the cementing material past the plug.

The lower ends of plugs 10 and 16 are preferably tapered as shown at 17 to guide the plugs through the bore of the casing, and the packing for the plugs may be mounted on annular shoulders 18 formed at the upper ends of the plugs by reducing their diameter as shown at 19. The packing is preferably annular cup-packing 20 snugly engaging the casing wall and fixed against shoulders 18 by followers 21 which may be held in place by pins 22.

In operation, the section of the string of casing which is provided with ports 4 and recess 7 may form a shoe 2a at the lower end of the string of casing, and the string of casing thus presents a uniform bore without any substantial obstruction pror to the lowering of plug 10, with ports 4 closed by their spring-seated valves 5. The casing may be washed down or drilling may be continued through the casing, the substantially open bore permitting freedom of such operations; and when it is desired to circulate a washing medium, the casing preferably rests upon the formation seat, as shown in Fig. 1, so that the washing fluid forced downwardly through the casing will open valves 5 and thus flow outwardly through the ports and upwardly in the surrounding bore, although if it is preferred, and is feasible in any particular instance, the casing may be raised from its formation seat and circulation established through the bottom of the casing which may be later lowered, if desired, and the circulation continued through said ports.

Figure 2:
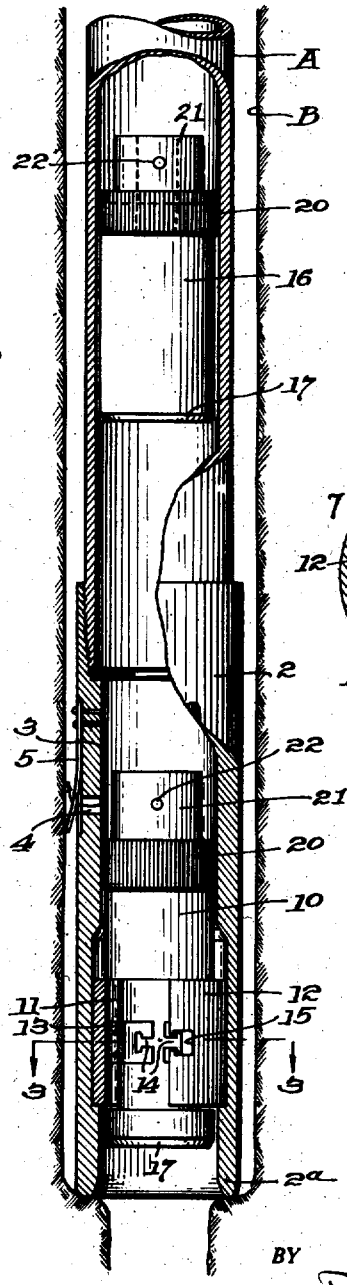
Fig. 2 is a similar view showing the lower plug anchored in the casing and the traveling plug cooperating therewith during the cementing operation.
Figure 3:
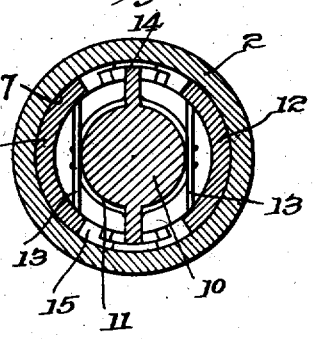
Fig. 3 is a transverse section on the line 3—3 of Fig. 2.

The washing medium may be forced downwardly through the casing by the plug 10 being lowered through the casing in back of the washing medium, the plug being preferably forced downwardly by a cementing mixture introduced into the casing above the plug, until the plug automatically anchors in recess 7 immediately below ports 4 and thus shuts off the bore of the casing below the ports, as shown in Fig. 2.

The desired quantity of the cementing mixture is accurately measured by lowering the plug 16 into the casing in back of the predetermined quantity of cement, as shown in Fig. 2, the plug 16 being forced downwardly against the cementing mixture by a suitable fluid so that the pressure opens valves 5 for discharge of the cementing material through the ports 4 and into the surrounding well bore.

When all of the cement is discharged, plug 16 is arrested by abutment against anchored plug 10, thereby indicating that the cementing operation is completed; and with the parts in this position, the cement is prevented from back flow into the casing, not only by the closing of valves 5, but also by the plug 16 closing the bore of the casing to ports 4.

I have thus provided for drilling operations or circulating of a washing medium through a substantially open casing bore, with subsequent automatic anchoring of a plug in the bore, and flow of cementing material downwardly through the bore of the casing until it is stopped by the plug, and thence outwardly through the casing to fill the surrounding well bore.

While I have in the above specification specifically disclosed and described a single practical method for stopping or anchoring the plug below peripheral ports without obstructing the casing, it will be quite obvious to those of skill in this art that various other means, perhaps creating slight and more or less immaterial obstructions or restrictions in the casing, may be devised, all, however, maintaining a bore in the casing sufficiently open for practical purposes and therefore without departing from the spirit of my invention.

I claim:

1. The method of cementing wells, which consists of: first, closing the bore of a normally substantially open well-casing at a predetermined point intermediate its upper and lower ends by means of a traveling plug inserted near the top of the casing and forced by fluid pressure downwardly through said casing and stopped at a predetermined point by means attached to the casing and relatively immovable with respect thereto; second, opening, by the pressure of circulating fluid from the top of the well normally spring-closed ports located in said casing above said predetermined point of casing-bore closure; third, forcing pressure fluid downwardly through said casing and outwardly through said ports; fourth, forcing, by pump pressure from the top of the well, a fluid cementing mixture downwardly through said casing and outwardly through said ports; fifth, permitting said ports to close by the release of pressure from the top of the well, thus holding the cement in the annular space outside of the casing.

2. The method of cementing wells, which consists of: first, establishing fluid circulation through a well casing and through the annular space outside of the casing; second, inserting in its upper portion a plug carrying means closely but slidingly fitting said casing; third, forcing a liquid cementing mixture into said casing above said plug and downwardly through said casing carrying and advancing said plug; fourth, closing the bore of said casing by the stoppage of said plug by means within said casing and fixed relatively thereto, at a predetermined point intermediate the upper and lower ends of said casing; fifth, continuing the application of fluid pressure from the top of the well to force open normally closed ports in said casing above said predetermined point of closure and to force said cementing fluid outwardly through said ports into the annular space outside of the casing; sixth, releasing pressure from the top of the well to permit valves controlling said ports to close, thus preventing the cement in the annular space outside of the casing from flowing back into the casing.

ERD V. CROWELL.